United States Patent [19]

Wisniewski

[11] Patent Number: 4,536,830
[45] Date of Patent: Aug. 20, 1985

[54] REFLECTOR ASSEMBLY FOR LAMP FIXTURES

[76] Inventor: Gregory G. Wisniewski, 4737 N. Marlborough Ave., Whitefish Bay, Wis. 53211

[21] Appl. No.: 634,596

[22] Filed: Jul. 26, 1984

[51] Int. Cl.³ .............................................. F21S 3/00
[52] U.S. Cl. .................................. 362/223; 362/225; 362/226; 362/232; 362/235; 362/249; 362/254; 362/277; 362/297; 362/307; 362/310; 362/319; 362/346; 362/355; 362/375; 362/433; 362/457
[58] Field of Search ............... 362/223, 225, 226, 232, 362/235, 254, 249, 277, 297, 307, 310, 319, 346, 355, 375, 433, 457

[56] References Cited

U.S. PATENT DOCUMENTS 4,336,576  6/1982  Crabtree .............................. 362/240
4,403,275  9/1983  Oser ................................... 362/220
4,432,044  2/1984  Lautzenheiser .................. 362/33 X Primary Examiner—Stephen J. Lechert, Jr.
Attorney, Agent, or Firm—Andrus, Sceales, Starke & Sawall

[57] ABSTRACT

A reflector assembly for replacing a fluorescent lamp from a multi-lamp fixture having a top wall and oppositely disposed end and side walls enclosed by a diffuser plate. The assembly includes a reflector member extending longitudinally between the end walls of the fixture and width wise between the top and side walls of a fixture. The reflector member includes a plurality of walls disposed at obtuse angles with respect to one another to reflect a substantial portion of the illumination received from a remaining source lamp to produce a lamp image under the center line of the removed lamp on the diffuser plate so that it appears that a complete number of lamps are provided in the fixture even though less than a complete number of lamps are employed.

11 Claims, 4 Drawing Figures

REFLECTOR ASSEMBLY FOR LAMP FIXTURES

BACKGROUND OF THE INVENTION

The present invention relates to fluorescent lamp fixtures, and more particularly to a fluorescent lamp fixture having a reflector in place of at least one of the fluorescent lamps.

Fluorescent lamp fixtures are extensively used for lighting work areas in offices, factories and residences. One common type of fluorescent lamp fixture includes four fluorescent lamps mounted within a housing recessed to fit in a suspended ceiling and enclosed by an acrylic or polystyrene lens. Such fixtures, however, are manufactured in different sizes with a variety of different lenses, lamps and control ballasts available.

As a result of the ever increasing cost of electricity, users of fluorescent lighting have sought various means to reduce energy costs by decreasing electrical energy consumption. The easiest and most economical method of reducing electrical usage with fluorescent lighting is to delamp the fixture by removing two of the four fluorescent lamps. The energy reduction is 50%, but the light levels are also reduced 50%. In most cases this reduction is too drastic. Additionally, the psychological impact on people of removing two lamps contributes to the ineffectiveness of this method of decreasing costs. In other words, when people see a fixture without two lamps, they don't think they have enough light regardless of what the actual light levels may be.

Another mechanism for reducing the electrical energy consumption of fluorescent light fixtures is to delamp the fixture by removing two of the lamps from the fixture and replacing the removed lamps with a reflector assembly. An example of converting a four lamp fixture to a two lamp fixture can be found in U.S. Pat. No. 4,403,275. In this patent, two of the four lamps are replaced by reflectors having concave-convex shapes that are mounted within the lamps holders in the positions of the lamps that were removed from the fixture.

Another means for converting a four lamp fluorescent fixture to a two lamp fluorescent fixture is to completely redesign the housing of the fixture. For example, in U.S. Pat. No. 4,336,576 the standard fixture housing is replaced by a pair of concave housings which reflect light downwardly from each of the remaining fluorescent lamps. This type of conversion, however, requires replacement of the entire fixture and thus may be employed only with newly constructed facilities and is not readily adaptable for retrofitting fixtures already in use.

SUMMARY OF THE INVENTION

A reflector assembly for replacing a fluorescent lamp in a multi-lamp fixture. The assembly includes a reflector member which is positioned in place of a removed lamp to reflect a substantial portion of the illumination received from the remaining lamp. The reflector member is bent to specific angles to produce a lamp image under the center line of the removed lamp on the lens of the fixture. The fixture thus provides substantially the same amount of illumination as was provided prior to the removal of one of the lamps and also appears to have a complete number of lamps provided when in fact less than a complete number of lamps are employed.

The reflector member includes a first portion extending downwardly from the top wall of a fixture and a second portion extending between the first portion and a side wall of the fixture. The first portion includes a first wall proximate to the top wall and disposed at an acute angle thereto and a second wall extending downwardly from the first wall disposed at an obtuse angle with respect to the first wall. The second portion includes a third wall disposed at an obtuse angle with respect to the second wall and at an acute angle with respect to the side wall.

The assembly also includes attaching means for attaching the reflector member to the fixture. In one form, this attaching means may include a first flange extending along the length of the first wall adjacent the top wall, a second flange extending along the length of the third wall adjacent the side wall, and connecting means for connecting the flanges to the top and side walls. The connecting means may comprise adhesive means in the form of double-backed strips of adhesive tape interposed between the flanges and the top and side walls of the fixture.

The present invention thus provides a reflector assembly for replacing a fluorescent lamp from a multi-lamp fixture which is efficient, inexpensive and does not materially reduce the illumination provided. The assembly may be employed to retrofit already existing fixtures or with newly manufactured fixtures.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
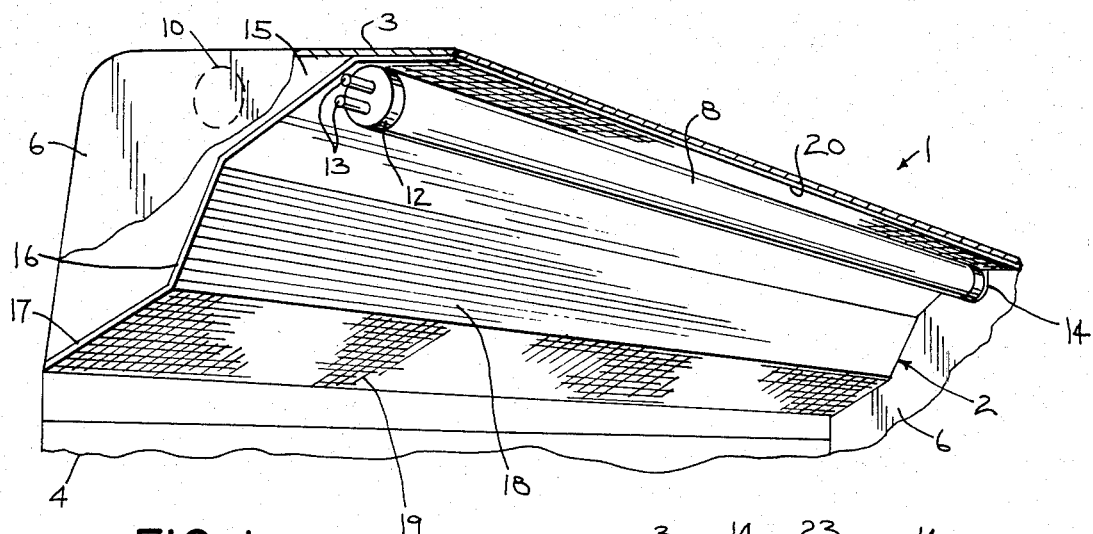
FIG. 1 is a fragmentary perspective view of a portion of a fluorescent lamp fixture incorporating a reflector assembly constructed in accordance with the principles of the present invention.
Figure 2:
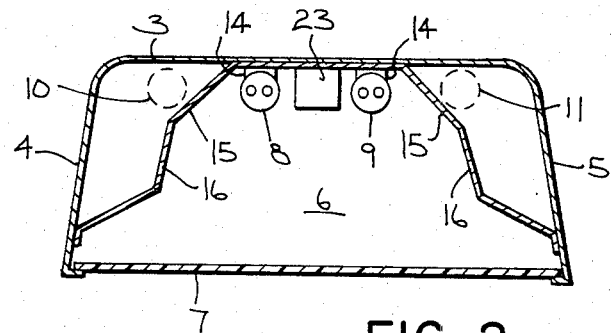
FIG. 2 is a schematic end view in section of a fluorescent lamp fixture incorporating a pair of the reflector assemblies shown in FIG. 1.

Referring now to the drawings, FIG. 1 illustrates a fluorescent lamp fixture, designated generally by the numeral 1, of standard construction incorporating a reflector assembly 2 constructed in accordance with the principles of the present invention. FIG. 2 illustrates fixture 1 as incorporating a pair of reflector assemblies 2 in a four-lamp fixture 1. The reflector assembly 2 may be incorporated with numerous types of fixtures 1 having various shapes, sizes and dimensions, and the structure illustrated is only one of such forms. Also, reflector assembly 2 may be incorporated with fixtures 1 that may be supported by either being suspended from a ceiling or recessed within an aperture through a ceiling or wall.

Fixture 1 has a top wall 3, opposite side walls 4 and 5 and opposite ends walls 6 enclosed by a lens or diffusion plate 7 supported by the lower ends of side walls 4 and 5. As shown best in FIG. 2, fixture 1 forms a housing for mounting two fluorescent lamps 8 and 9. In a conventional fixture, two additional lamps would be provided at the dashed line locations 10 and 11. However, the lamps which would conventionally be provided at locations 10 and 11 are omitted, and replaced by a pair of reflector assemblies 2. The reflector assemblies 2 are positioned to reflect a substantial portion of the illumination received from the remaining source lamps 8 and 9 to produce a lamp image under the center line of the removed lamps on diffuser plate 7. In this way, although there are no fluorescent tubes at locations 10 and 11, it is made to appear, at least to some extent, from beneath diffuser plate 7 that lamps are present at those locations.

Each lamp 8 and 9 has a cap 12 carrying two pins 13 at its longitudinal ends. Pins 13 extend through caps 12 and are connected to the lamp filament within the tube of lamps 8 and 9. Each lamp 8 and 9 is mounted to fixture 1 by inserting the ends of pins 13 into a corresponding pair of lamp holders 14 located on end walls 16 and rotating 90° C. so that the pins 13 are properly engaged with the electrical contacts within lamp holders 14 to support lamps 8 and 9 and provide an electrical connection therefor. Standard fluorescent lamps 8 and 9 are available in various diameters and lengths. For example, lamps 8 and 9 may be 24, 36, and 48 and 96 inches long, and are available with nominal wattage ratings of 20, 30, 40 or 75 watts to satisfy varying lighting requirements. Lamps 8 and 9 are typically controlled in an office environment by a light switch which energizes a ballast 23 which in turn energizes lamps 8 and 9.

According to the invention, reflector assemblies 2 are incorporated within fixture 1 to replace the lamps normally provided at 10 and 11 to reflect the illumination provided by lamps 8 and 9 and provide illumination substantially equivalent to the illumination provided by four fluorescent lamps. Such an assembly provides savings in energy consumption and in cost of operation. Reflector assemblies 2 reflect the illumination from lamps 8 and 9 so that a lamp image is produced under the center line of removed lamps 10 and 11 on diffuser plate 7 so that it appears that a complete number of lamps, i.e. four, are provided, within fixture 1 when in fact only two lamps are provided within fixture 1.

In order to accomplish this, reflector assemblies 2 comprise a metal sheet of aluminum bent to specific angles to produce the necessary image on diffuser plate 7 at the location of the lamp pair that have been removed from fixture 1. The metal sheet includes an upper portion having a first wall 15 adjacent or proximate top wall 3 and a second wall 16 extending downwardly from wall 15, and a lower portion extending between wall 16 and sidewall 5 comprising a third wall 17. Each of the walls 15-17 extend longitudinally between end walls 6 and include an outer planar reflective surface having minimum light absorption in order that the highest light reflection efficiency may be achieved. Walls 15 and 16 preferably include a reflective surface comprised of specular 85% reflective tape such as that available under the designation 7924 Chrome from the 3M Company. The tape is applied to the outer surface of walls 15 and 16 to completely cover the outer surface thereof. The outer surface of wall 17, on the other hand, may be coated with a layer of paint 19 such as 80% glass white paint. These reflective surfaces provide high light reflective efficiency while minimizing light absorption so that an actual image of the fluorescent lamps 8 and 9 are provided on diffusion plate 7.

Figure 3:
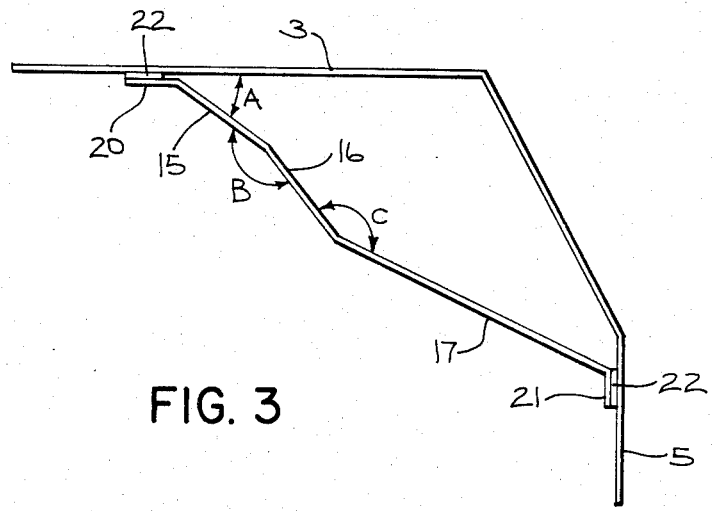
FIG. 3 is a fragmentary end view illustrating the position of a reflector assembly for use with a standard deep fixture.
Figure 4:
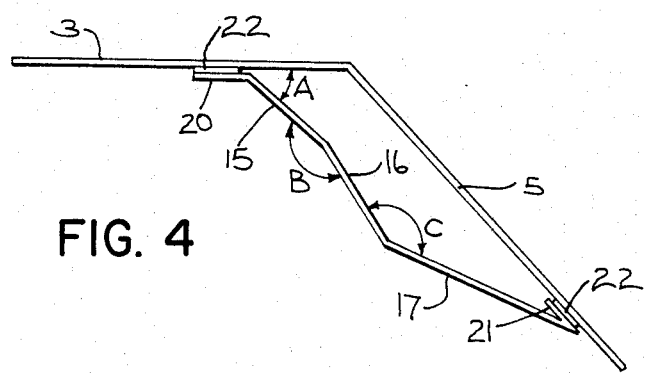
FIG. 4 is a fragmentary end view illustrating a reflector assembly positioned for use with a standard shallow fixture.

Upper wall 15 is disposed at an acute angle A with respect to top wall 3. Acute angle A may be vary from between about 10° to about 60° depending upon the dimensions of fixture 1. As shown in FIG. 3 for a typical standard deep fixture angle A is about 35° while in FIG. 4 for a typical standard shallow fixture angle A is about 45°. Middle wall 16 is disposed at an obtuse angle B with respect to wall 15 which may vary from about 100° to about 180°. As shown in both FIGS. 3 and 4, angle B is about 165°. Wall 17 is also disposed at an obtuse angle C with respect to wall 16. Angle C may vary between about 110° and 180°. As shown in FIG. 3, angle C is approximately 155° while in FIG. 4 angle C is approximately 150°. The angles A, B and C may all vary slightly depending upon the particular dimensions of fixture 1. However, when properly installed the break between walls 15 and 16 should be positioned approximately under the center line of the unused lamp. Thus, when properly aligned, the midline of the specular reflective surface on walls 15 and 16 should be beneath and on or closely adjacent to the center line of the unused lamp. This will produce an image of the removed lamp on the diffusion plate 7.

As a means for attaching walls 15-17 to top wall 3 and side walls 4 or 5 of fixture 1, reflector assembly 2 includes an integral flange 20 extending along the length of wall 15 adjacent top wall 3, a second integral flange 21 extending along the length of wall 17 adjacent side wall 4 or 5, and connecting means for connecting the flanges 20 and 21 to the top wall 3 and side walls 4 or 5. The connecting means may comprise adhesive means interposed between the flanges 20 and 21 and walls 3-5 of fixture 1. Preferably, the adhesive means includes double-backed strips of adhesive tape 22 such as ½" by 1" white mounting tape No. 4945 available under the trade designation "Scotch" from the 3M Company. The strips of tape 22 may be applied at three spaced points so that one strip is on each end and a third strip near the middle of flanges 20 and 21. It should also be noted that flanges 20 and 21 may either be an outwardly extending portion of walls 15 and 17 as shown in FIG. 3, or may be turned inwardly as shown by flange 21 in FIG. 4.

A reflector assembly for replacing a fluorescent lamp from a multi-lamp fixture has been illustrated and described. Various modifications and/or substitutions may be made to the specific components described herein without departing from the scope of the invention. For example, various types of attaching means may be used to attach walls 15-17 to fixture 1, and various types of reflective materials may be applied to the outer surfaces of walls 15-17 so long as those coatings have minimum light absorption.

Various modes of carrying out the invention are contemplated as being within the scope of the following claims particularly pointing out and distinctly claiming the subject matter which is regarded as the invention.

I claim:

1. A releasably mounted insert for interconnection with a multi-lamp fluorescent lighting fixture having a top wall and oppositely disposed end and side walls enclosed by a diffuser plate, and an elongated fluorescent source lamp secured in said fixture between said end walls, said insert replacing a second fluorescent lamp from said fixture and comprising:

a reflector member dimensioned to have a length substantially corresponding to the length of a side wall of a fixture and a width sufficient to extend between a top and side wall of a fixture, said reflector member including a first portion extending downwardly from said top wall and a second portion extending between said first portion and said side wall, said first portion disposed at an acute angle with respect to said top wall, and said first and second portions disposed at an obtuse angle with respect to one another; and attaching means for releasably attaching said reflector member to said fixture to reflect the illumination provided by the fluorescent source lamp so that the illumination provided by the source lamp is substantially equivalent to the illumination provided by the source lamp and the removed second lamp.

2. The insert of claim 1, wherein said first and second portions are positioned to reflect a substantial portion of the illumination received from a remaining source lamp to produce a lamp image under the centerline of the removed lamp on the diffuser plate.

3. The insert of claim 2, wherein said first portion includes first and second planar walls disposed at an obtuse angle with respect to one another.

4. The insert of claim 3, wherein said second portion is disposed at an acute angle with respect to said side wall.

5. A releasably mounted insert for interconnection with a multi-lamp fluorescent lighting fixture having a top wall and oppositely disposed end and side walls enclosed by a diffuser plate, and an elongated fluorescent source lamp secured in said fixture between said end walls, said insert replacing a second fluorescent lamp from said fixture and comprising:

a reflector member dimensioned to have a length substantially corresponding to the length of a side wall of a fixture and a width sufficient to extend between a top and side wall of a fixture, said reflector member including a first portion extending downwardly from said top wall, said first portion including a first wall proximate to said top wall and disposed at an acute angle with respect to said top wall, and a second wall extending downwardly from said first wall disposed at an obtuse angle with respect to said first wall, and a second portion extending between said second wall and said side wall, said second portion including a third wall disposed at an obtuse angle with respect to said second wall and an acute angle with respect to said side wall; and attaching means for releasably attaching said reflector member to said fixture, said attaching means includes a first flange extending along the length of said first wall adjacent said top wall, a second flange extending along the length of said third wall adjacent said side wall, and connecting means for connecting said flanges to said top and side walls to reflect the illumination provided by the fluorescent source lamp so that the illumination provided by the source lamp is substantially equivalent to the illumination provided by the source lamp and the removed second lamp.

6. The insert of claim 5, wherein said connecting means comprises adhesive means interposed between said flanges and said top and side walls.

7. The insert of claim 6, wherein said adhesive means comprises double backed strips of adhesive tape.

8. The insert of claim 5, further including reflective means for reflecting light on the outer surfaces of said first, second and third walls.

9. The insert of claim 8, wherein the reflective means on said first and second walls is specular reflective tape.

10. The insert of claim 8, wherein the reflective means on said third wall is a coating of paint.

11. The insert of claim 5, wherein said first, second and third walls are positioned to reflect a substantial portion of the illumination received from a remaining source lamp to produce a lamp image under the centerline of the removed lamp on the diffuser plate.

* * * * *